Sept. 24, 1935.        F. H. MUSSLER              2,015,120
                       FORMING ATTACHMENT
                      Filed Oct. 13, 1934         3 Sheets-Sheet 2

INVENTOR.
FRANK H. MUSSLER
BY  H. T. Sperry
        ATTORNEY

Sept. 24, 1935.   F. H. MUSSLER   2,015,120
FORMING ATTACHMENT
Filed Oct. 13, 1934   3 Sheets-Sheet 3
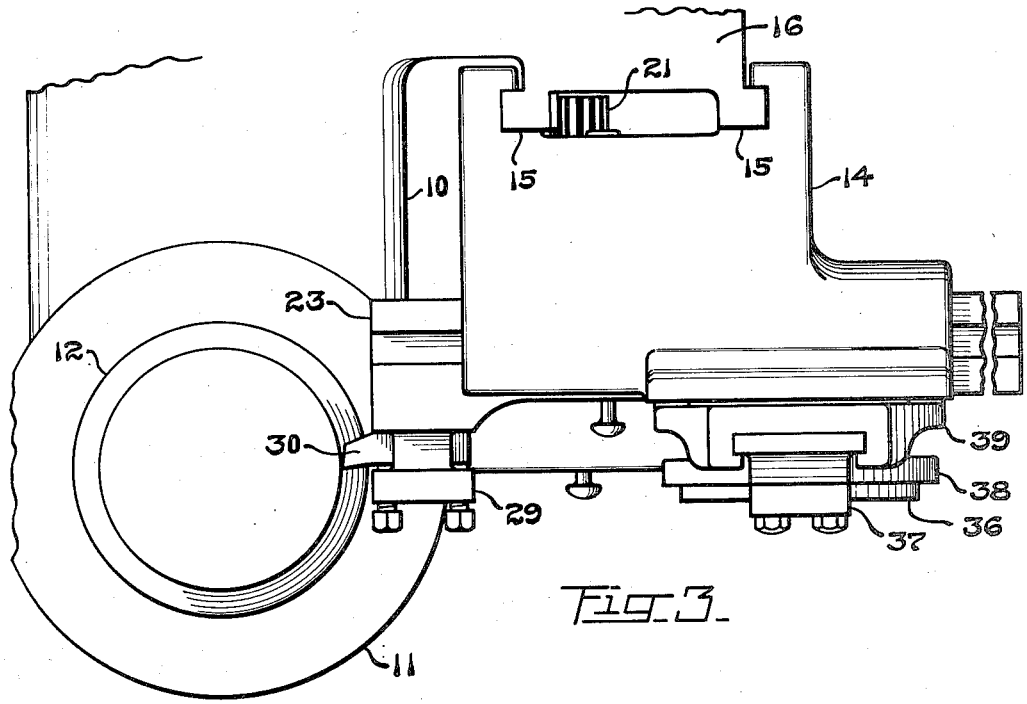
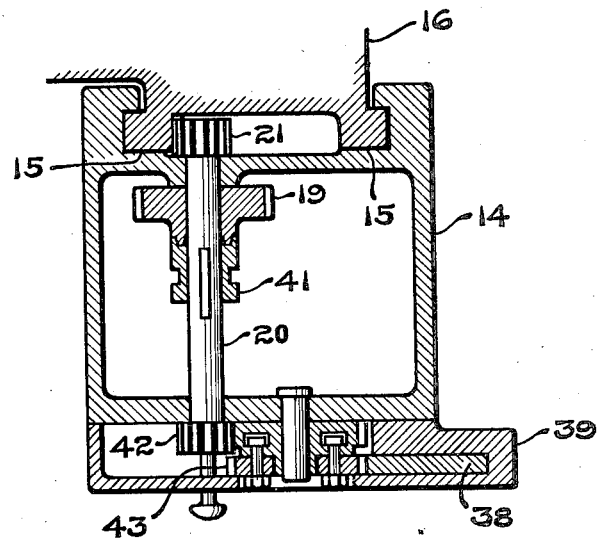
INVENTOR.
FRANK H. MUSSLER
BY H. T. Sperry
ATTORNEY Patented Sept. 24, 1935

2,015,120

UNITED STATES PATENT OFFICE 2,015,120

FORMING ATTACHMENT

Frank H. Mussler, Stratford, Conn., assignor to The Bullard Company, a corporation of Connecticut Application October 13, 1934, Serial No. 748,173

14 Claims. (Cl. 82—16)

The invention relates to forming attachments for turning machines, such as lathes or boring mills. It belongs to the class of such devices designed to move a cutting tool over a rotating work surface at a selectively variable angle, from the vertical or horizontal, and in response to a purely vertical or horizontal movement of the tool-carrying head or slide.

It is among the general objects of the invention to provide a forming attachment which will deliver tool movement in an improved vibrationless and steady travel; the structure being such as to preclude the transmission of chatters, vibrations, and the like, from the machine tool bed to the tool, and to move the tool in a steady, pulsationless travel in response to the applied driving force.

Another object of the invention is to provide a forming attachment which will give angular movement of the tool through a self-contained instrumentality, independent of the bed of the machine tool, with which it is associated, and independent of the floor upon which the machine tool rests.

A further object is to provide a forming attachment of the character set forth, which will be simple and efficient, and which will conform to the demands of being both economic in manufacture and economic in operation.

Another object is to provide a forming attachment which may be readily applied to and removed from a tool head and feed works assembly of lathes, boring mills and the like. Such an attachment being free from the necessity of change and adjustment in cooperating parts of the machine tool.

In prior art forming attachments, it has been customary to provide a stationary element having a cam slot, to which can be attached a tool holding bar, so that movement of the tool head and the bar, with respect to the fixed slot, would give to the bar a movement at an angle to the applied movement of the bar, and a vertical, or horizontal, feed to the bar which would result in an angular path of travel of the cutting tool.

In such devices, it has been customary to secure the cam-carrying element in a fixed position by securing it to the floor adjacent the machine tool, or the extended portion of the machine tool base. In the former case, movement of the floor, with respect to the bed of the machine, would produce dislocation of the parts and, vibration of the machine, with respect to the floor, would set up vibrations of the tool, with respect to the work, so that failure in the accuracy of such devices would follow. In the second instance, vibration of the tool bed would be carried to the cam-holding member, which vibrations would be carried through to the tool and, as in the former case, accuracy of work could not be ensured.

It is, therefore, obviously among the objects of the invention to provide an instrumentality which will solve the problems presented by such prior art.

Numerous other objects and features of the invention will be apparent from consideration of that form of the invention shown in the accompanying drawings, in which:

Figure 3 is a top plan view of the device shown in Figure 1 and;

Figure 4 is a horizontal section taken on the broken line, 4—4, of Figure 1.

Figure 1:
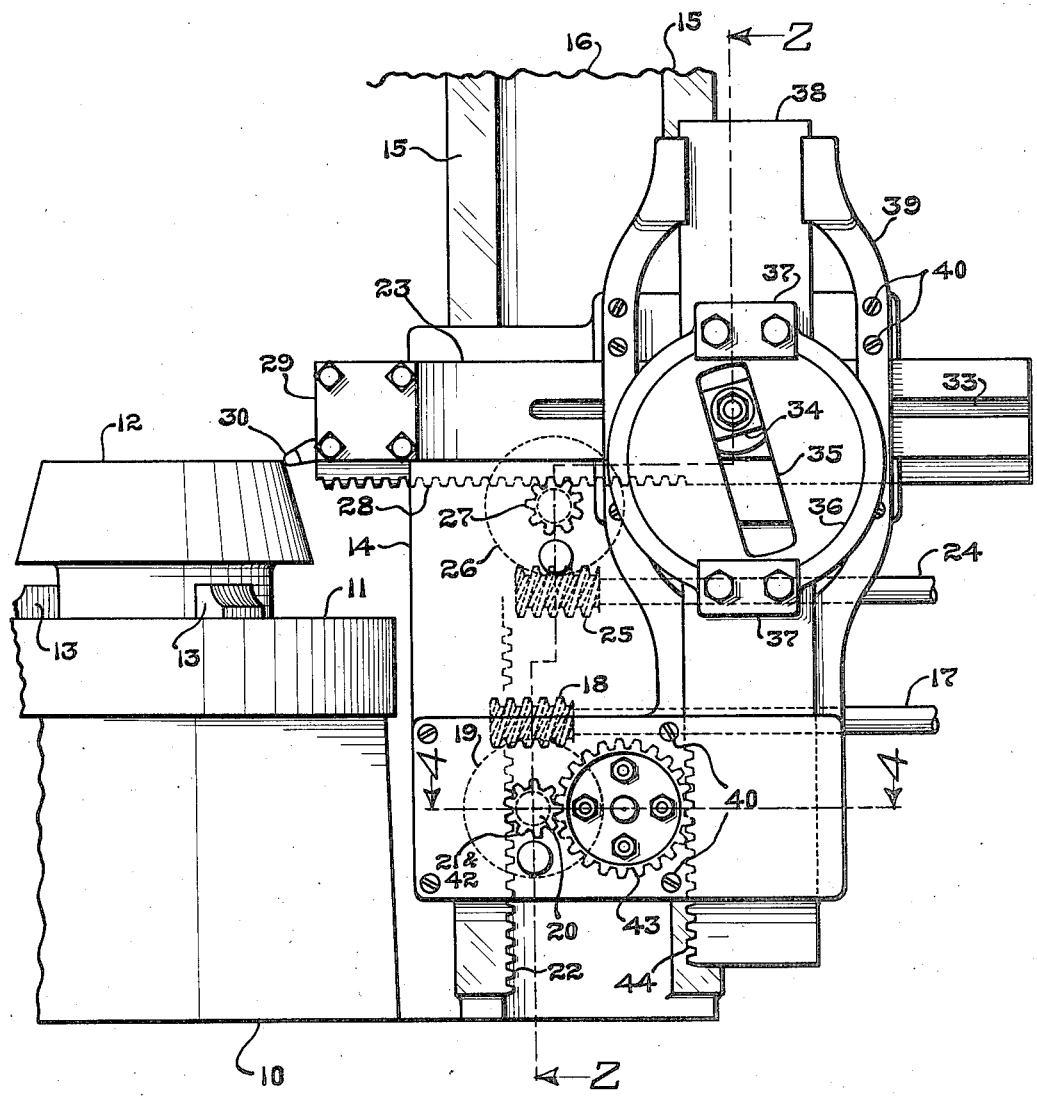
Figure 1 is a front view of one embodiment of the invention.

From a consideration of the drawings, it will be seen that the invention follows the prior art in providing a tool-supporting arm, which may be moved through a suitable driving mechanism, and which forms no part of the present invention, in either a pure vertical, or horizontal, direction. In that form of the invention illustrated, the horizontal movement may be achieved through movement of the tool-carrying bar, itself, with respect to the tool head, while pure vertical movement may be achieved through vertical movement of the entire head.

The tool-carrying bar is provided with an extending arm, which may be engaged through a slotted cam plate, with respect to which the bar moves in either its vertical, or horizontal, movements. By the configuration of the slot, or by its angular adjustment, the bar will be given a thrust at an angle to the direction of its driven movement, so that, in vertical movement, a horizontal increment may be added to the bar, or in horizontal movement, an increment of vertical movement may be added to the bar.

In order to provide a vibrationless, steady and self-contained means for retaining the cam plate stationary, with respect to the work, a gearing arrangement is provided such that, for downward movement of the whole head, an opposite upward movement of the plate may be applied and vice versa. Such gearing arrangement is provided in the side head so that such movement is free from vibration of either the base of the machine, or of vibrations between the machine and floor. The arrangement also permits variations in the gearing so that the movement of the cam plate may be greater, or less, than the movement of the bar so as to multiply, or divide, the added increment of movement. With the gear ratio such that the movement of the plate equals the vertical movement of the head, it will be seen that a true stationary position of the plate, with respect to the work, is maintained.

Referring to the drawings, the numeral 10 indicates the base of the machine of a vertical boring mill type. The base supports the work holding table 11, upon which the work, as indicated at 12, is secured by chucks 13, or an equivalent fixture. The machine is provided with a side head, which, in general, is indicated by the numeral 14. The side head is adapted to be vertically moved on suitable ways 15 of a vertical up-standing portion 16 of the base. Such vertical movement of the side head is provided for by a horizontal feeding shaft 17, the inner end of which is provided with a worm 18, meshing with a gear 19, loosely mounted upon a shaft 20; a clutch 41 being provided for clutching the gear 19 to the shaft 20. The shaft 20 has fixed thereon a pinion 21, meshing with a rack 22, formed on the portion 16 of the base. Thus, upon rotation of the shaft 17, the worm 18 rotates the gear 19 and, with the gear 19 clutched, the pinion 21, which, through enmeshment with the rack 22, raises or lowers the whole side head in accordance with the rotation of the shaft 17.

The side head 14 carries a transversely movable tool bar 23, which moves vertically with the side head. The bar 23 may be moved sideways, independent of the side head, upon the rotation of the shaft 24, which, similar to the shaft 17, is provided with a worm 25, meshing with a gear 26. The gear 26, loosely mounted on a shaft A, may be clutched, or unclutched, by a clutch 44 with the shaft A, which carries fixed thereon a pinion 27, meshing with a rack 28, formed on the underside of the bar 23. Thus, upon rotation of the shaft 24, the worm 25 will turn the gear 26 and, if the clutch 44 is engaged, the pinion 27 will turn with the gear 26; thus, reciprocating the tool bar 23 transversely of the side head.

The cutting tool of the device may be of any form and may be secured in any desirable manner to the tool bar, such as by the holder construction 29; the conventional form of tool being indicated by the numeral 30.

The structure, hereinbefore described, is substantially conventional, and it will be seen that, without recourse to the cam plate, a pure vertical movement of the tool may be secured by rotating the shaft 17, while the shaft 24 is stationary; and, likewise, a pure horizontal movement of the tool across the work surface may be secured by rotation of the shaft 24, while the shaft 17 is stationary. Since the invention is not concerned with the modes of driving either the shaft 17, or 24, it will suffice to point out that it is conventional practice to drive both the shafts from a single driving source, but to have such drives selective so that either shaft may be driven but precluding simultaneous drive of the shaft from such source. Obviously, a compounding of movement, so as to obtain a movement of the tool at an angle to either the horizontal, or vertical, could be secured by a simultaneous rotation of the shafts, but since such simultaneous rotation would involve a complicated gearing and would preclude a convenient variation of such compounding, this expedient is not advisable.

However, the operations of the side head of such a machine would be seriously handicapped should it not be possible to provide a compounding, or so-called forming movement, for the tool 30. To accomplish this movement, the present invention provides for the securement to the bar 23 of a stud 31, the head 32 of which is adjustably mounted in a T-shape slot 33 of the bar. The stud 31 carries a cam slot engaging shoe 34, which extends through a cam slot 35 in the cam plate 36, which is mounted for rotatable adjustment through releasable securing lugs 37 in a cam-carrying slide 38, which slide may be secured to the side head 14 by a slide bracket 39 secured to the head by screws 40.

An important feature of the present construction is the adjustability of the cam plate and the adjustability of the stud 31, and the vertical adjustability of the slide, itself, all of which provide a wide range of possible angular cutting.

The cam slot 35 may be of straight construction, as shown, or for particular configurations, the slot may be angular, or curved, as dictated by the contour desired to be cut by the tool 30. As in usual practice, a straight slot is illustrated. The plate 36, through which the slot extends, is rotatable within the slide 38, thus, the angle at which the slot extends may determine the angle at which the tool moves.

Since it is obviously necessary in angular turning that, during a vertical driven movement of the head, the slot will move, with respect to the movement of the head, so as to move the tool bar transversely to effect compounding, means are provided for accomplishing this respective movement. As, hereinbefore, stated, it has been customary to secure a slide of this nature either to the base of the machine, or to the floor upon which the base is secured. In either instance, the respective movement between the slide and head is subject to infallibility due to vibrations, or mis-adjustments, as before stated. Furthermore, in such instances, the ratio between the transverse movement and the vertical movement of the tool, itself, is limited by the angle at which the cam slot is positioned. In the present device, as will be pointed out, the slide, itself, may be geared so as to move, with respect to the base, as well as with respect to the movement of the head, so that a multiplication, or division, of the effect of the angular setting of the cam slot may result.

Similarly when the tool bar 23 is driven from the shaft 24, angular turning will require a movement of the side head to accomplish the desired compounding. In this case, the movement of the side head results from the angular setting of the slot 35 which, by engagement with the shoe 34, will move the side head and, with it, the tool bar. In this instance, the movement of the plate, with respect to the head, will cause a drive through the gears 43 and 42 so as to move the side head vertically in a proportion to the movement of the slide determined by the angle of the slot and by the ratio of the gearing. In this instance, the clutch 41 is disconnected so that the rotation of the shaft 20 is independent of the gear 19 and, similarly in the former case, the clutch 44 is disconnected so that the shaft A rotates independently of the gear 26.

In a preferred embodiment of the invention, the gearing for moving the slide is arranged to be equal to the gearing for raising, or lowering, the side head and, therefore, the slide will remain stationary, with respect to the base, during the driven movement of either the head, or tool bar. The compounded movement of the tool is, therefore, equal to the angular adjustment of the cam slot.

Figure 2:
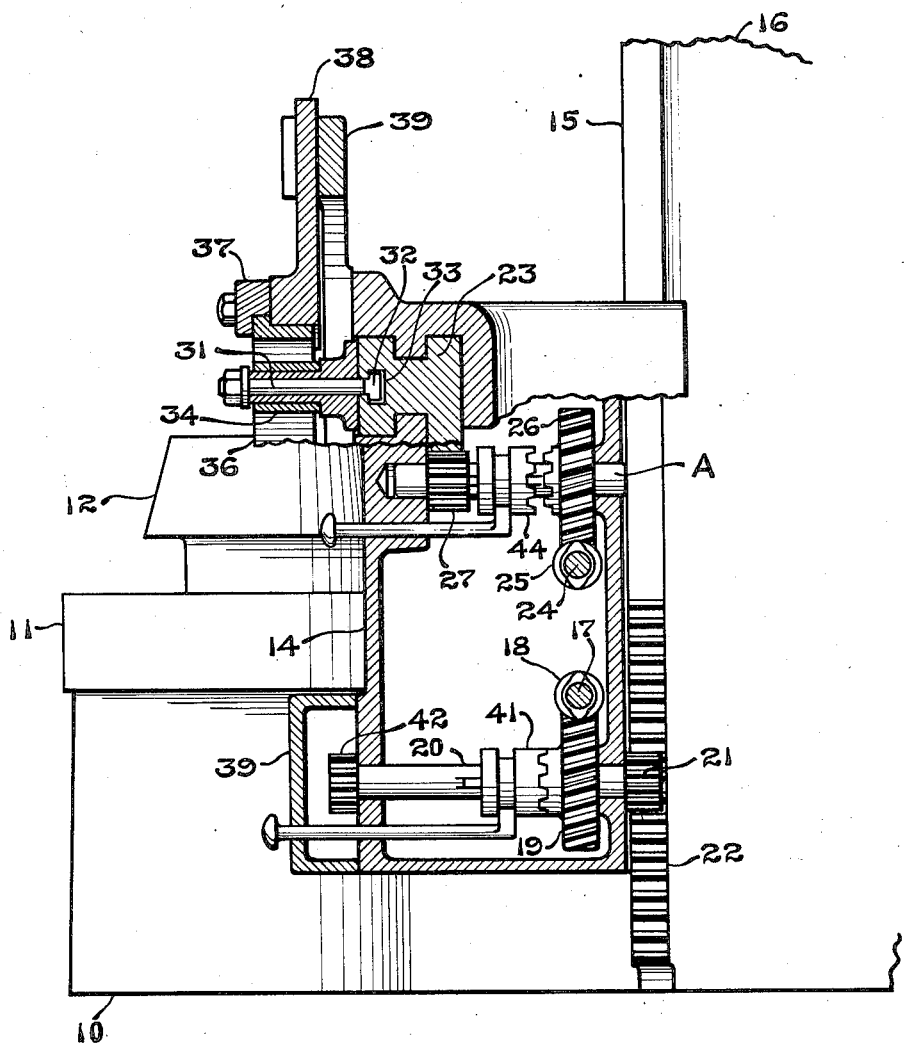
Figure 2 is a vertical section taken on the broken line, 2—2, of Figure 1.

For so moving the cam-carrying slide, a clutch 41 is provided, which may be arranged to engage the gear 19, which operates the vertical movement of the head. By the engagement of the clutch 41 with the gear 19, a pinion 42 is rotated with a gear 19; the pinion 42 enmeshing with a slide-driving gear 43, which, in turn, engages a rack 44 on the edge of the slide 38. Thus, with the clutch engaged, as the shaft 17 rotates, both the pinions, 21 and 42, will be rotated and, by means of the intermediate gear 43, the slide 38 will be fed at a rate equal to the movement of the head, so that, the slide will stand still with respect to the base of the machine. This being the arrangement of the clutches in Figure 2.

When form cutting is desired through a drive to the tool bar 23, the clutch 41 is disconnected; while the clutch 44 is connected, rotation of the shaft 24 thus imparts rotation to the shaft A, the tool bar is moved transversely and, by engagement of the shoe 34, the slide is moved proportionate to the angular setting of the cam slot, which movement drives the gears 43, 42 and 21, thereby moving the head in such a manner as to maintain the slide stationary with respect to the base of the machine.

In the operation of the device, when either vertical, or transverse, movement, alone, is required, the stud 31 may be removed from the bar 23, or the cam slot may be set vertically, or horizontally, depending on whether the head, or bar, is driven. Thus, the rotation of the shafts, 17, or 24, will cause pure vertical, or transverse, movement of the tool 30. When a compounding movement of the tool is required, the stud 31 is applied and/or the cam adjusted to the required angle, and the clutch 41, or 44, is engaged, depending upon which drive is used. Thus, upon rotation of the shaft 17, or 24, the head 14, or bar 23, will be moved, and, by the engagement of the shoe 34 in the slot 35, and, by virtue of the respective stationary action of the slide 38, the head, or bar, will be moved in addition to the driven movement of the companion element; and, thus, a compounding of movements is provided so as to give an angular movement of the tool in accordance with the adjustment of the slot.

In order to increase, or decrease, the amount of such additional movement, the invention permits a variation in the ratio of the pinions, 21 and 42, so that, if desired, the slide 38 may be moved more, or less, than the head 14, but in synchronism with it. Thus, for any setting of the angle of the cam path 35, a greater, or less, compound movement may be obtained.

From the foregoing, it will be seen that the invention provides a simple forming attachment capable of transmitting compounded motion, without distortion, by vibrations of other parts of the machine and, without distortion, due to misalignment of the machine. The invention further provides a wide flexibility and great range in the possible compounded movements obtainable.

It will, of course, be understood that the invention, herein shown, may be subjected to numerous changes, modifications and the full use of the equivalent may be resorted to in the practice of the invention without departing from the spirit, or scope, thereof, as outlined in the pending claims.

Having set forth the nature of my invention, what I claim is:

1. In a metal turning machine, a forming attachment including a pair of rectilinearly moving bodies, one carrying the other, power means for independently driving either of said bodies and an inter-connecting means carried thereby for moving one body in response to power drive of the other body.

2. In a metal turning machine, a forming attachment including a pair of rectilinearly moving bodies, one carrying the other, power means for independently driving either of said bodies and an inter-connecting means carried thereby for moving one body in response to power drive of the other body, said inter-connecting means being adjustable to vary the ratio of movement of one body with respect to another.

3. In a metal turning machine, a forming attachment including a pair of rectilinearly moving bodies, one carrying the other, power means for independently driving either of said bodies and an inter-connecting means carried thereby for moving one body in response to power drive of the other body, said inter-connecting means being movable in response to movements of said bodies.

4. In a metal turning machine, a forming attachment including a pair of rectilinearly moving bodies, one carrying the other, power means for independently driving either of said bodies and an inter-connecting means carried thereby for moving one body in response to power drive of the other body, said inter-connecting means being movable in response to movements of said bodies so as to maintain a relatively stationary position with respect to the machine.

5. In a forming attachment, a holding body, a tool holder bar carried thereby, means for moving the body rectilinearly, means for moving the bar rectilinearly at right angles to the movement of the body and a self-contained connecting member between said body and bar adapted to cause movement of one in response to movement of the other, said means including a connection whereby it moves with respect to the movement of said body and said connection being adapted to move the connecting member equal and oppositely to the movement of the holding body.

6. In a forming attachment, the combination with a carrying body movable upon the bed of a machine tool, a tool holder bar carried by the body and movable transversely to the movement of said body, independent means for driving either said body or said bar, and an inter-connecting means adapted to move said body or bar in response to driven movement of said bar or body respectively.

7. In a forming attachment, the combination with a carrying body movable upon the bed of a machine tool, a tool holder bar carried by the body and movable transversely to the movement of said body, independent means for driving either said body or said bar, and an inter-connecting means adapted to move said body or bar in response to driven movement of said bar or body respectively, said means including a cam plate angularly adjustable to vary the ratio of movement between said body or bar.

8. In a forming attachment, the combination with a carrying body movable upon the bed of a machine tool, a tool holder bar carried by the body and movable transversely to the movement of said body, independent means for driving either said body or said bar, and an inter-connecting means adapted to move said body or bar in response to driven movement of said bar or body respectively, said means including a cam plate angularly adjustable to vary the ratio of movement between said body or bar and a connection between said plate and said machine for moving said plate with respect to said body.

9. In a forming attachment, the combination with a carrying body movable upon the bed of a machine tool, a tool holder bar carried by the body and movable transversely to the movement of said body, independent means for driving either said body or said bar, and an inter-connecting means adapted to move said body or bar in response to driven movement of said bar or body respectively, said means including a cam plate angularly adjustable to vary the ratio of movement between said body or bar and a connection between said plate and said machine for moving said plate with respect to said body equally and oppositely to the movement of said body with respect to said machine.

10. In a forming attachment for a machine tool, a side head, a tool carrying bar carried by the side head and movable transversely thereof, a gearing connection for moving said side head with respect to the body of the machine tool, a driving connection for operating said gearing and auxiliary means for operating said gearing in response to movement of said bar.

11. In a forming attachment for a machine tool, a side head, a tool carrying bar carried by the side head and movable transversely thereof, a gearing connection for moving said bar in said side head, a power drive connection for said gearing and auxiliary means for driving said gearing in response to movement of said side head with respect to the machine tool.

12. In a machine tool, a side head, a forming attachment, therefor, including a transversely moving tool bar, gearing for moving said bar, gearing for moving the side head, a cam plate, a pin carried by said bar engaging a slot in said cam plate, means for moving said bar transversely in response to movement of said side head, the same means being operable to move the side head in response to transverse movement of the tool bar.

13. In a machine tool, a side head, a forming attachment, therefor, including a transversely moving tool bar, gearing for moving said bar, gearing for moving the side head, a cam plate, a pin carried by said bar engaging a slot in said cam plate, and means for moving said bar transversely in response to movement of said side head, the same means being operable to move the side head in response to transverse movement of the tool bar, said cam plate being adjustable to vary the angle of the cam slot so as to control the ratio of movement of side head or tool bar in response to movement of said bar or side head.

14. In a machine tool, a side head, a forming attachment, therefor, including a transversely moving tool bar, gearing for moving said bar, gearing for moving the side head, a cam plate, a pin carried by said bar engaging a slot in said cam plate and means for moving said bar transversely in response to movement of said side head, the same means being operable to move the side head in response to transverse movement of the tool bar and said gearing for moving said side head including means for moving said cam plate proportionately and oppositely to the movement of said head.

FRANK H. MUSSLER.